United States Patent Office 2,953,577
Patented Sept. 20, 1960

2,953,577

ALIPHATIC TETRAHYDROPYRANYL ETHER-ESTERS AND PROCESS FOR MAKING SAME

Amelio E. Montagna and Donald G. Kubler, South Charleston, and Julius J. Brezinski, St. Albans, W. Va., assignors to Union Carbide Corporation, a corporation of New York No Drawing. Filed June 12, 1957, Ser. No. 665,118

2 Claims. (Cl. 260—345.8)

This invention relates to a new class of aliphatic tetrahydropyranyl ether esters, and to a novel process for the production thereof from a lactone of a 6-hydroxy-tetrahydropyran-2-carboxylic acid. More especially, the invention concerns a novel class of aliphatic hydrocarbyl 6 - alkoxy - 6 - alkenoxy - and 6 - alkynoxytetrahydropyran-2-carboxylates having structures designated by the formula

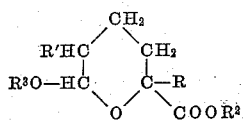

wherein R and R', respectively, represent hydrogen or a lower alkyl radical; and $R^2$ and $R^3$, respectively, designate a member of the class consisting of alkyl radicals having 1 to 20 carbon atoms, alkenyl radicals having 3 to 6 carbon atoms, and the alkynyl radicals having 3 to 6 carbon atoms, the $R^2$ radical having at least as many carbon atoms as the $R^3$ radical.

The novel compounds of this invention have utility as plasticizers for various synthetic resins, and particularly for polyvinyl chlorides, and vinyl resins containing a major portion of vinyl chloride in the polymer. The compounds also have outstanding utility for the production of useful polymeric compositions by reaction thereof with ketene in the presence of an acidic catalyst such as boron trifluoride. This is particularly surprising since similar compounds wherein $R^3$ is phenyl react with ketene to give phenyl acetate as the major and only identifiable product.

In the practice of the present invention for the production of aliphatic hydrocarbyl 6-alkoxytetrahydropyran-2-carboxylates of the aforesaid structure wherein $R^2$ and $R^3$ both represent the same alkyl, alkenyl or alkynyl radical, a lactone of a 6-hydroxytetrahydropyran-2-carboxylic acid, either unsubstituted or substituted on the 2 and 5 positions of the ring with a lower alkyl radical, and having a structure represented by the formula:

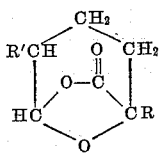

wherein R and R', respectively, represent hydrogen or a lower alkyl radical are reacted with a molar excess of an alkanol having 1 to 20 carbon atoms, or an alkenol or alkynol respectively having from 3 to 6 carbon atoms, in the presence of an acidic catalyst, at temperatures sufficiently high to vaporize the water formed in the process and permit its constant removal from the reaction mixture as formed. Preferably, the reaction is conducted in the presence of a water-entraining agent such as diisopropyl ether, dibutyl ether, chloroform, cyclohexane, heptane, methylene dichloride, or benzene to facilitate prompt removal of the water overhead as an azeotropic mixture. Usually the mixture of reactants is heated to reflux temperatures and the water formed in the condensation reaction continuously is removed until no more water is formed. The reaction mixture then is cooled. Preferably, but not necessarily, it then is allowed to stand at or near room temperature (20°–30° C.) for around 1 to 24 hours in the presence of the catalyst to facilitate the most favorable equilibrium conditions for the acetalization reaction. The reaction mixture then is neutralized with a suitable alkaline compound such as the alkali metal alkoxides, alkali metal carboxylates, carbonates, and bicarbonates, alkali metal, hydroxides, and corresponding alkaline earth metal compounds, to neutralize the acidic catalyst. The resultant mixture then is fractionally distilled under vacuum to remove unreacted alcohol and entraining solvent. The residue is fractionally distilled under vaccum, and the desired product separately recovered overhead.

The modification of the process for the production of compounds of the invention wherein $R^2$ and $R^3$ represent the same hydrocarbyl radical is illustrated by the equation:

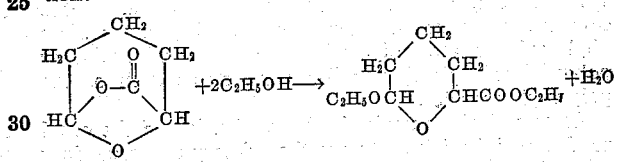

The aforesaid lactones and alcohol are usually reacted in molar ratios of from around 1:2 to around 1:10 or more. Acid catalyst concentrations of from 0.01 to 2.0% based upon the total weight of the reactants, are effective, and 0.03 to 0.75% of the catalyst gives good results. The higher catalyst concentrations are preferred when employing the lower boiling alkanols such as methanol and ethanol as reactant. Among highly useful acidic catalysts are sulfuric acid, sodium hydrogen sulfate, hydrogen chloride, benzenesulfonic acid, p-toluenesulfonic acid, and the like.

In accordance with another form of the invention, the aforesaid novel compounds wherein $R^2$ and $R^3$ represent the same hydrocarbyl radical are converted by transesterification into a novel class of compounds of the formula:

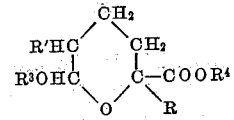

wherein R and R' represent hydrogen or a lower alkyl radical, and $R^3$ and $R^4$ represent different alkyl, alkenyl or alkynl radicals, and $R^4$ is a radical of an alcohol boiling higher than $R^3OH$.

These last-named novel compounds are produced in accordance with the invention by heating and reacting a mixture of an alkyl, alkenyl, or alkynyl 6-alkoxy-, 6-alkenyloxy-, or 6-alkynyloxy-tetrahydropyran-2-carboxylate, wherein the hydrocarbyl radicals $R^2$ and $R^3$ are the same, or a corresponding derivative substituted in the tetrahydropyran nucleus by one or more lower alkyl radicals, with a molar excess of an alkanol, alkenol or alkynol boiling above $R^2OH$, in the presence of a basic catalyst such as the alkali metals, the alkali metal alkoxides, and the like. Surprisingly it has been discovered that, when the alcohol reactant boils above the boiling point of the alcohol $R^2OH$ formed in the transesterification, the latter can be effected in the presence of basic catalysts without any transetherification being observed, according to the representative equation:

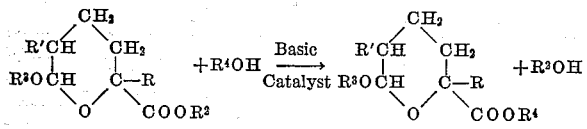

The aforesaid reaction is conducted at elevated temperatures and conditions such that the lower boiling alcohol formed is continuously removed overhead as it is formed. After completion of the reaction the reaction mixture is fractionally distilled under vacuum to remove overhead unreacted alcoholic reactant. The residual alkyl, alkenyl or alkynyl 6-alkoxy-, alkenoxy, or alkynyloxy tetrahydropyran-2-carboxylate then is removed by fractional distillation under vacuum and is separately recovered.

The acetal-esters or ether-esters of the invention are clear, high boiling liquids possessing a pleasant odor. They are useful intermediates in the preparation of various organic compounds. Thus, the alkyl 6-alkoxytetrahydropyran-2-carboxylates react with ketene in the presence of Lewis acids to yield polymeric esters of α-hydroxy-ε-alkoxysuberic acids. They also are useful solvents and plasticizers for vinyl resins, such as the polyvinyl chlorides and the copolymers of vinyl chloride and vinyl acetate, as more fully disclosed herein. Those compounds of the invention that contain one or more allyl radicals are polymerizable compounds useful as polymerizable plasticizers for vinyl resins such as the polyvinyl chlorides.

Among alcohols useful in the production of the novel products of the invention are the primary and secondary alkanols, such as methanol, ethanol, 2-propanol, butanol, 2-methyl-1-propanol, hexanol, octanol, 2-ethylbutanol, 2-ethylhexanol, decanol, and hexadecanol; the alkenols having 3 to 6 carbon atoms, such as allyl alcohol, crotonyl alcohol, and 2-penten-4-ol; and alkynols such as propargyl alcohol, 2-butyn-1-ol, 3-pentyn-1-ol, and 5-hexyn-1-ol.

The lactones of 6-hydroxytetrahydropyran-2-carboxylic acids of the structure

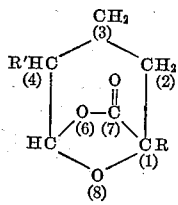

used as starting materials in the process, also can be designated as 7-oxo-6,8-dioxabicyclo (3.2.1) octane and the 7-oxo-6,8-dioxa-1,4-dialkylbicyclo (3.2.1) octanes. Such compounds are made in known manner by subjecting a derivative of 3,4-dihydro-1,2-pyran having a carboxyl group attached to the carbon atom in the 2-position of the dihydropyran ring to conditions favoring cyclization reaction, e.g.—temperatures of 35°–200° C., preferably in the presence of an acidic agent such as sulfuric acid.

Typical compounds of the invention include ethyl 6-ethoxytetrahydropyran-2-carboxylate, butyl 6-butoxytetrahydropyran-2-carboxylate, n-octyl 6-octyloxytetrahydropyran-2-carboxylate, 2-ethylhexyl 6-(2-ethylhexoxy) tetrahydropyran-2-carboxylate, hexadecyl 6-hexadecyloxytetrahydropyran-2-carboxylate, allyl 6-allyloxy-tetrahydropyran-2-carboxylate, propargyl 6-propargyloxytetrahydropyran-2-carboxylate, crotyl 6-crotyloxytetrahydropyran-2-carboxylate, ethyl 2,5-dimethyl-6-ethoxytetrahydropyran-2-carboxylate, 2-ethylhexyl 2,5-diethyl-6-(2-ethylhexoxy)tetrahydropyran-2-carboxylate, butyl 6-ethoxytetrahydropyran-2-carboxylate, 2-ethylhexyl 6-ethoxytetrahydropyran-2-carboxylate, hexadecyl 6-butoxytetrahydropyran-2-carboxylate, decyl 6-allyloxytetrahydropyran-2-carboxylate, allyl 6-ethoxytetrahydropyran-2-carboxylate, 2-ethylhexyl 6-allyloxytetrahydropyran-2-carboxylate, 2-ethylhexyl 6-propargyloxytetrahydropyran-2-carboxylate, decyl 6-decyloxytetrahydropyran-2-carboxylate and 2-ethylhexyl 2,5-dimethyl-6-ethoxytetrahydropyran-2-carboxylate.

The following examples will serve to illustrate the invention:

*Example 1*

Into the kettle of a still equipped with a packed column and a condenser were introduced 228 grams (1.78 mols) of 7-oxo-6,8-dioxabicyclo[3.2.1]octane, 658 grams (14.3 mols) of ethanol, 6.65 grams of concentrated sulfuric acid (0.75 weight percent) based upon the total reactants, and 200 cc. of diisopropyl ether. The reaction mixture was heated to reflux and the water of reaction was removed constantly as formed. When water was no longer formed the reaction mixture was cooled to room temperature and held there for 18 hours. It then was neutralized with alcoholic sodium ethoxide, after which the excess ethanol and diisopropyl ether were removed by distillation. The liquid residue then was distilled under 2 mm. mercury pressure yielding 307 grams of ethyl 6-ethoxytetrahydropyran-2-carboxylate as a clear liquid boiling at 85 to 87.5° C. at that pressure, and having a pleasant odor. It had a specific gravity at 20/15.6° C.=1.0490 and $n_D^{20}$=1.4405. It had a saponification equivalent=201 (theory=202) and the following analysis, in percent by weight:

|   | Calculated for $C_{10}H_{18}O_4$ | Found |
|---|---|---|
| C | 59.4 | 59.4 |
| H | 9.0 | 9.1 |

*Example 2*

A mixture of 128.2 grams (1.0 mol) of 7-oxo-6,8-dioxabicyclo[3.2.1]octane, 472 grams (8.1 mols) of allyl alcohol, 200 cc. of diisopropyl ether, 4 grams of concentrated sulfuric acid (0.5 weight percent based upon the total reactants) and 4 grams of copper sulfate as inhibitor was heated to reflux and the water of reaction was constantly removed from the reaction mixture as formed. After 16 hours when water was no longer formed the mixture was cooled to room temperature and held there for about 16 hours. The copper sulfate was removed by filtration of the reaction mixture, and thereafter the catalyst was neutralized with sodium ethoxide. Excess allyl alcohol and the diisopropyl ether then were removed by distillation, after which the liquid residue was fractionally distilled and the allyl 6-allyloxytetrahydropyran-2-carboxylate in the form of a water clear liquid boiling at 88.5°–91.5° C. under 0.5 mm. mercury was separately recovered. It had the following properties: $n_D^{20}$=1.4618; specific gravity at 20/15.6° C.=1.0261; saponification equivalent=227.5 (theory=226.3); the compound had the following analysis in percent by weight:

|   | Calculated for $C_{12}H_{18}O_4$ | Found |
|---|---|---|
| C | 63.7 | 63.5 |
| H | 8.0 | 8.2 |

*Example 3*

To a mixture containing 296 grams (2.31 mols) of 7-oxo-6,8-dioxabicyclo[3.2.1]octane, 963 grams (7.5 mols) of 2-ethylhexanol, and 250 cc. of di-n-butyl ether were added 5 drops of concentrated sulfuric acid (around 0.03 weight percent, based upon the total reactants). The resultant solution was heated to 150° C. while under a pressure of 100 mm. mercury, and the water of reaction formed was constantly removed. When water was no longer formed the reaction mixture was cooled to room temperature and held there for several days. Then the catalyst was neutralized with sodium bicarbonate, after which the di-n-butyl ether and excess 2-ethylhexanol were removed by distillation. The resultant residue was then fractionally distilled under vacuum, yielding 678 grams of 2-ethylhexyl 6-(2-ethylhexoxy)-tetrahydropyran-2-carboxylate as a clear liquid boiling at 170–175° C. under a pressure of from 0.5 to 1.0 mm. mercury. The compound had a saponification equivalent of 368 (theory=370); $n_D^{20}$=1.4528; specific gravity at 20/15.6° C.=0.9415. It had the following analysis, in percent by weight:

|   | Calculated for $C_{22}H_{42}O_4$ | Found |
|---|---|---|
| C | 71.2 | 71.3 |
| H | 11.4 | 11.2 |

This compound is an effective plasticizer for resinous copolymers of vinyl chloride and vinyl acetate containing 94 to 97% of the chloride in the polymer in amounts of 50%, based on the weight of said polymer.

*Example 4*

A solution of 412 grams (2.64 mols) 7-oxo-2,5-dimethyl-6,8-dioxabicyclo[3.2.1]octane, 388 grams (8.43 mols) of ethanol, 100 cc. diisopropyl ether, and 4 grams of sulfuric acid (approximately 0.5 weight percent, based upon the total reactants), were heated at reflux while removing the water of reaction formed. After completion of the reaction the mixture was cooled to room temperature and held there for 16 hours. The reaction mixture was then treated with sodium ethoxide to neutralize the catalyst. The neutralized reaction mixture was then fractionally distilled under vacuum and the ethyl 6-ethoxy-2,5-dimethyltetrahydropyran-2-carboxylate was separately recovered in the form of 575 grams of a clear liquid boiling at 74–76° C. under a pressure of 0.5 to 0.75 mm. mercury. It had a saponification equivalent of 230.5 (theory=230.3); a specific gravity at 20/15.6° C.=1.0006; and $n_D^{20}$=1.4366. It had the following analysis, in percent by weight:

|   | Calculated for $C_{12}H_{12}O_4$ | Found |
|---|---|---|
| C | 62.6 | 62.5 |
| H | 9.6 | 9.8 |

*Example 5*

A charge consisting of 384 grams (3.0 mols) of 7-oxo-6,8-dioxabicyclo[3.2.1]octane, 1580 grams (10.0 mols) of Oxo decanol, 400 cc. diisopropyl ether and 9.8 grams of concentrated sulfuric acid was heated to the reflux temperature in the kettle of a still, the water formed during the reaction being continuously removed until its formation ceased. The mixture was cooled to room temperature and held there overnight. Then 90 grams of sodium acetate were added to neutralize the catalyst, and the mixture was fractionally distilled under vacuum. The fraction boiling at 212–213° C. under the pressure of 0.5 mm. mercury and consisting of decyl 6-decyloxy-tetrahydropyran-2-carboxylate was separately recovered. This compound had the following physical properties: $n_D^{20}$=1.4589; specific gravity at 20/15.6° C.=0.933, and a saponification equivalent of 422.3 (theory=426.3).

This compound was found to be an effective plasticizer for a commercial polyvinyl chloride resin, comparing favorably with the dioctyl phthalate commonly used for plasticizing polyvinyl chloride resins when used in a weight ratio of 1:0.6.

The Oxo decanols used in this example was a mixture of refined primary decyl alcohols derived from the hydroformylation of a tripropylene fraction from the polymerization of propylene, followed by the hydrogenation of the decanal-decanol fraction isolated from the hydroformylation mixture. This mixture boiled in the 220° C. range at atmospheric pressure, and consisted essentially of primary decanols.

*Example 6*

A mixture of 128 grams (1.0 mol) of 7-oxo-6,8-dioxabicyclo[3.2.1]octane, 336 grams (6.0 mols) of propargyl alcohol, 200 cc. diisopropyl ether, and 2.3 grams of concentrated sulfuric acid were heated to reflux in a still kettle and the water of reaction was removed as formed. When the reaction had ceased the mixture was held at room temperature for 16 hours, after which the catalyst was neutralized with sodium acetate, and the neutralized mixture was fractionally distilled under vacuum, yielding 181 grams (81.5% yield) of propargyl 6-propargyloxy-tetrahydropyran-2-carboxylate as a product distilling at 126–9° C. under 1 mm. mercury pressure. The compound had the following properties: $n_D^{20}$=1.4825; specific gravity at 20/15.6° C.=1.136; a saponification equivalent of 211.0 (theory=222.2); molecular refraction=55.8 (theory=56.2).

*Example 7*

To a solution of 101 grams (0.5 mol) of ethyl 6-ethoxy-tetrahydropyran-2-carboxylate in 390.7 grams (3 mols) of 2-ethylhexanol was added a solution of 2.4 g. (0.5 weight percent of catalyst, based upon the total reactants) of sodium ethoxide dissolved in 50 cc. of ethanol. The solution was heated at 150° C. and the ethanol formed in the transesterification reaction was continuously removed as formed, while reducing the pressure from atmospheric to 100 mm. mercury. Upon completion of the reaction the excess 2-ethylhexanol was distilled overhead. Thereafter the residue was fractionally distilled under vacuum, and the 2-ethylhexyl 6-ethoxy-tetrahydropyran-2-carboxylate was separately recovered overhead as a clear liquid boiling at 143–145° C. under 2 mm. mercury. This compound had a specific gravity at 20/15.6° C. of 0.9745; $n_D^{20}$=1.4482; a saponification equivalent of 282.5 (theory=286.4). It had the following analysis, in percent by weight:

|   | Calculated for $C_{16}H_{30}O_4$ | Found |
|---|---|---|
| C | 67.1 | 67.5 |
| H | 10.6 | 10.7 |

*Example 8*

Following the general procedure described in Example 7, 134 grams (0.625 mol) of allyl 6-allyloxytetrahydropyran-2-carboxylate and 407 grams (3.25 mols) of 2-ethylhexanol were heated to 125° C. at 100 mm. mercury, in the presence of 2.7 grams (0.5 weight percent, based upon the total reactants) of sodium ethoxide dissolved in 50 cc. ethanol. The ethanol and the allyl alcohol released in the transesterification were removed by distillation under the vacuum existing. After completion of the reaction excess 2-ethylhexanol was removed by distillation under reduced pressure. The still residue was fractionally distilled under vacuum, yielding 127.5 grams of 2-ethylhexyl 6-allyloxytetrahydropyran-2-carboxylate as a clear liquid boiling at 139–142° C. under 1 mm. mercury, and having the following properties: saponification equivalent 298.4 (theory=298.4); $n_D^{20}$=

1.4565; specific gravity at 20/15.6° C.=0.983. The compound had the following analysis, in percent by weight:

|   | Calculated for $C_{17}H_{30}O_4$ | Found |
|---|---|---|
| C | 68.4 | 68.2 |
| H | 10.1 | 9.9 |

Example 9

A mixture of 102 grams (0.5 mol) of ethyl 6-ethoxytetrahydropyran-2-carboxylate, 116 grams (2 mols) of allyl alcohol, and a solution of 1.1 grams of sodium ethoxide in 20 cc. of ethanol was heated to 108° C., the added ethanol and that formed in the resultant reaction being removed as fast as possible. After reaction completion the excess allyl alcohol was removed overhead by distillation. Thereafter fractional distillation under vacuum of the resultant liquid residue yielded 63 grams of allyl 6-ethoxytetrahydropyran-2-carboxylate as a clear liquid boiling at 85–86° C. under 1 mm. mercury pressure. It had the following properties: saponification equivalent 215.0 (theory=214.3); specific gravity at 20/15.6° C.=1.0545. It had the following analysis, in percent by weight:

|   | Calculated for $C_{11}H_{18}O_4$ | Found |
|---|---|---|
| C | 61.6 | 61.4 |
| H | 8.5 | 8.7 |

Example 10

After standing for about 16 hours in a still kettle, a mixture of 339 grams (1.5 mols) of allyl 6-allyloxytetrahydropyran-2-carboxylate, 711 grams (4.5 mols) of the mixture of Oxo decanols recited in Example 5, and 5.2 grams of sodium methoxide was fractionally distilled under vacuum, removing the allyl alcohol overhead as formed, and thereafter separately recovering 438 grams (89.5% yield) of decyl 6-allyloxytetrahydropyran-2-carboxylate in the form of a liquid boiling at 151–6° C. under a pressure of 0.6–0.7 mm. mercury. The compound had the following properties: saponification equivalent 321.2 (theory=326.5); molecular refraction 91.8 (theory 92.2); $n_D^{20}$=1.4599; specific gravity at 20/15.6° C.=0.9735.

The invention is susceptible of modification within the scope of the appended claims.

What is claimed is:

1. Process for making an aliphatic hydrocarbyl 6-hydrocarbyloxytetrahydropyran-2-carboxylate having the structure

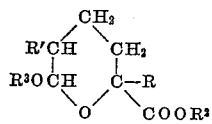

wherein R and R', respectively, represents a member of the class consisting of hydrogen and the lower alkyl radicals, and $R^2$ and $R^3$, respectively, represents the same member of the class consisting of the alkyl radicals having 1 to 20 carbon atoms, the alkenyl radicals having 3 to 6 carbon atoms, and the alkynyl radicals having 3 to 6 carbon atoms, which comprises reacting a lactone of the formula

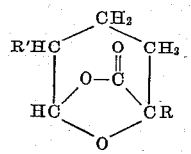

wherein R and R' have the aforesaid meanings, with an aliphatic alcohol of the class consisting of the alkanols having 1 to 20 carbon atoms, the alkenols having 3 to 6 carbon atoms, and the alkynols having 3 to 6 carbon atoms, in the presence of an acidic condensation catalyst at temperatures sufficiently high to vaporize the water of condensation and permit constant removal of said water as formed.

2. Process for making an aliphatic hydrocarbyl 6-hydrocarbyloxytetrahydropyran-2-carboxylate having the structure

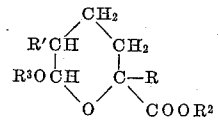

wherein R and R', respectively, represents a member of the class consisting of hydrogen and the lower alkyl radicals, and $R^2$ and $R^3$, respectively, represents a member of the class consisting of the alkyl radicals having 1 to 20 carbon atoms, the alkenyl radicals having 3 to 6 carbon atoms, and the alkynyl radicals having 3 to 6 carbon atoms, which comprises reacting a lactone of the formula

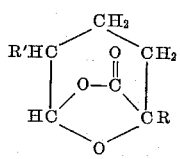

wherein R and R' have the aforesaid meanings, with an aliphatic alcohol of the class consisting of the alkanols having 1 to 20 carbon atoms, the alkenols having 3 to 6 carbon atoms, and the alkynols having 3 to 6 carbon atoms, in the presence of an acidic condensation catalyst at temperatures sufficiently high to vaporize the water of condensation and permit constant removal of said water as formed, and reacting the resultant carboxylate with a molar excess of an aliphatic alcohol having a boiling point above that of the first-named aliphatic alcohol, and selected from the class consisting of the alkanols having 1 to 20 carbon atoms, the alkenols having 3 to 6 carbon atoms, and the alkynols having 3 to 6 carbon atoms, in the presence of a basic esterification catalyst, and removing the lower boiling alcohol as formed.

References Cited in the file of this patent

UNITED STATES PATENTS

| 2,489,729 | Smith | Nov. 29, 1949 |
| 2,511,890 | Whetstone | June 20, 1950 |
| 2,514,172 | Whetstone et al. | July 4, 1950 |
| 2,619,491 | Smith | Nov. 25, 1952 |

FOREIGN PATENTS

| 680,461 | Great Britain | Oct. 8, 1952 |

OTHER REFERENCES

Fuson: Adv. Org. Chem., p. 201, Wiley (1950).